United States Patent [19]

Lipschitz

[11] Patent Number: 5,472,300
[45] Date of Patent: Dec. 5, 1995

[54] APPARATUS FOR PARTITIONING A STORAGE SPACE

[76] Inventor: Larry Lipschitz, 2 Chris Street, Alrode, Johannesburg, Transvaal, South Africa

[21] Appl. No.: 11,303

[22] Filed: Jan. 29, 1993

[30] Foreign Application Priority Data

Jan. 31, 1992 [ZA] South Africa ............................ 92/0707

[51] Int. Cl.⁶ .................................................. B61D 45/00
[52] U.S. Cl. ............................ 410/139; 410/138; 410/142; 296/24.1
[58] Field of Search ................................... 296/24.1, 181, 296/183, 138; 410/129, 130, 131, 132, 133, 134, 137–139, 140–142; 105/374, 378

[56] References Cited

U.S. PATENT DOCUMENTS

| | | | |
|---|---|---|---|
| 2,790,396 | 4/1957 | Port | 410/129 |
| 2,942,561 | 6/1960 | Cheshire | 410/129 |
| 3,280,760 | 10/1966 | Woods et al. | 410/130 |
| 3,376,599 | 4/1968 | Singer | 410/130 |
| 3,782,758 | 1/1974 | Williamson, III . | |
| 3,885,506 | 5/1975 | Mundinger et al. . | |
| 4,161,145 | 7/1979 | Patterson, III et al. . | |
| 4,247,236 | 1/1981 | LaBelle et al. | 410/129 |
| 4,943,110 | 7/1990 | Pastva | 296/138 |
| 4,986,707 | 1/1991 | Reemtsema et al. . | |
| 5,044,689 | 9/1991 | Evers . | |
| 5,176,338 | 1/1993 | Horton | 296/138 |

FOREIGN PATENT DOCUMENTS

| | | | |
|---|---|---|---|
| 0002209 | 11/1978 | European Pat. Off. . | |
| 0252707 | 7/1987 | European Pat. Off. . | |
| 2006897 | 9/1971 | Germany | 410/132 |
| 3422041 | 12/1985 | Germany | 410/129 |
| 2092535 | 2/1982 | United Kingdom . | |
| 2091647 | 8/1982 | United Kingdom | 296/138 |
| 2141983 | 5/1984 | United Kingdom . | |
| 2145759 | 4/1985 | United Kingdom | 296/138 |
| 2219976 | 4/1989 | United Kingdom . | |
| 2238988 | 9/1990 | United Kingdom . | |

Primary Examiner—Michael S. Huppert
Assistant Examiner—Gregory A. Morse
Attorney, Agent, or Firm—Needle & Rosenberg

[57] ABSTRACT

The disclosed invention is an apparatus for partitioning a storage space such as the load space of a goods vehicle having a frame which defines an opening through which the storage space is accessible, and at least one partition movable within the load space to define at least two compartments of desired relative size in the storage space. Both compartments are accessible through the opening, on either side of the partition. Expandable closure elements, typically in the form of collapsible trellis-type doors, are movable to close the opening, and be locked to each other or to the partition, so that access can be gained to either compartment, while the other remains secure. The expandable closure elements and the partition move on respective sets of tracks. A version of the invention is also disclosed in which movable partition elements in a storage space are provided with expandable closures, allowing access through the partitions.

16 Claims, 6 Drawing Sheets

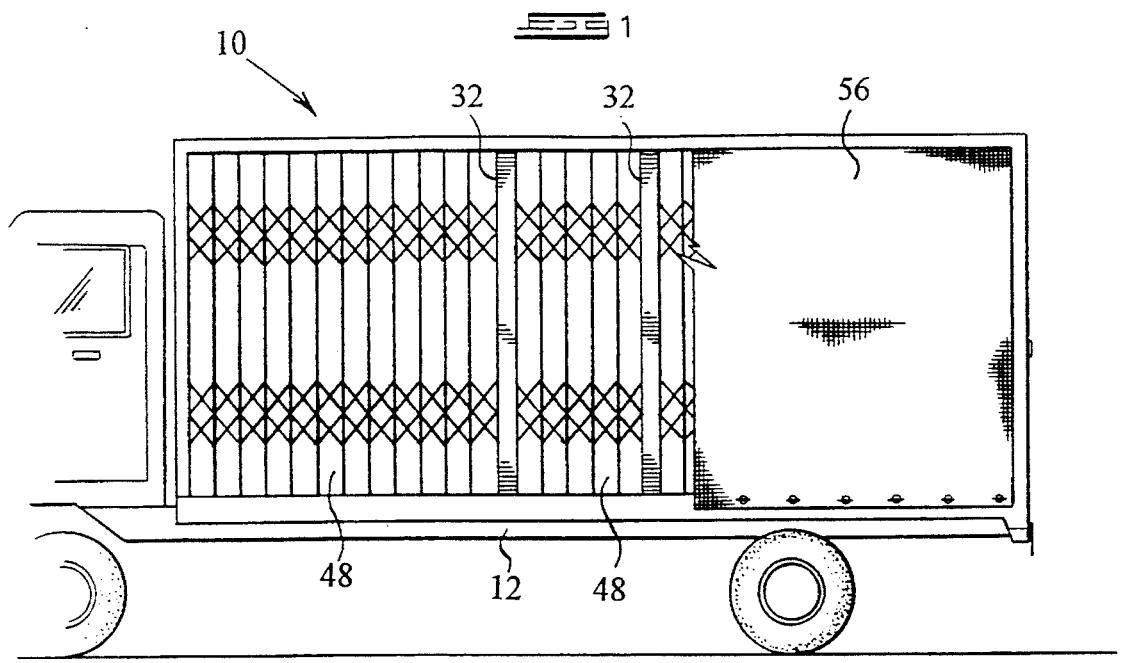
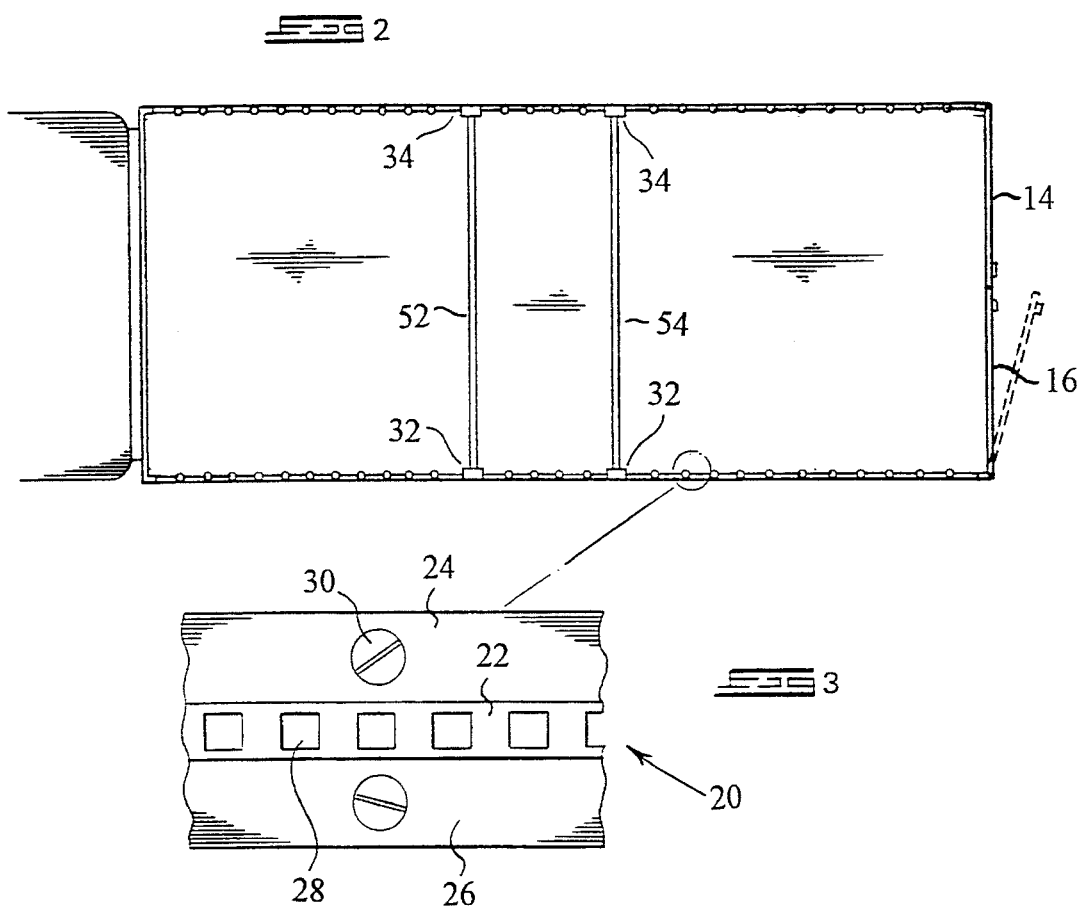

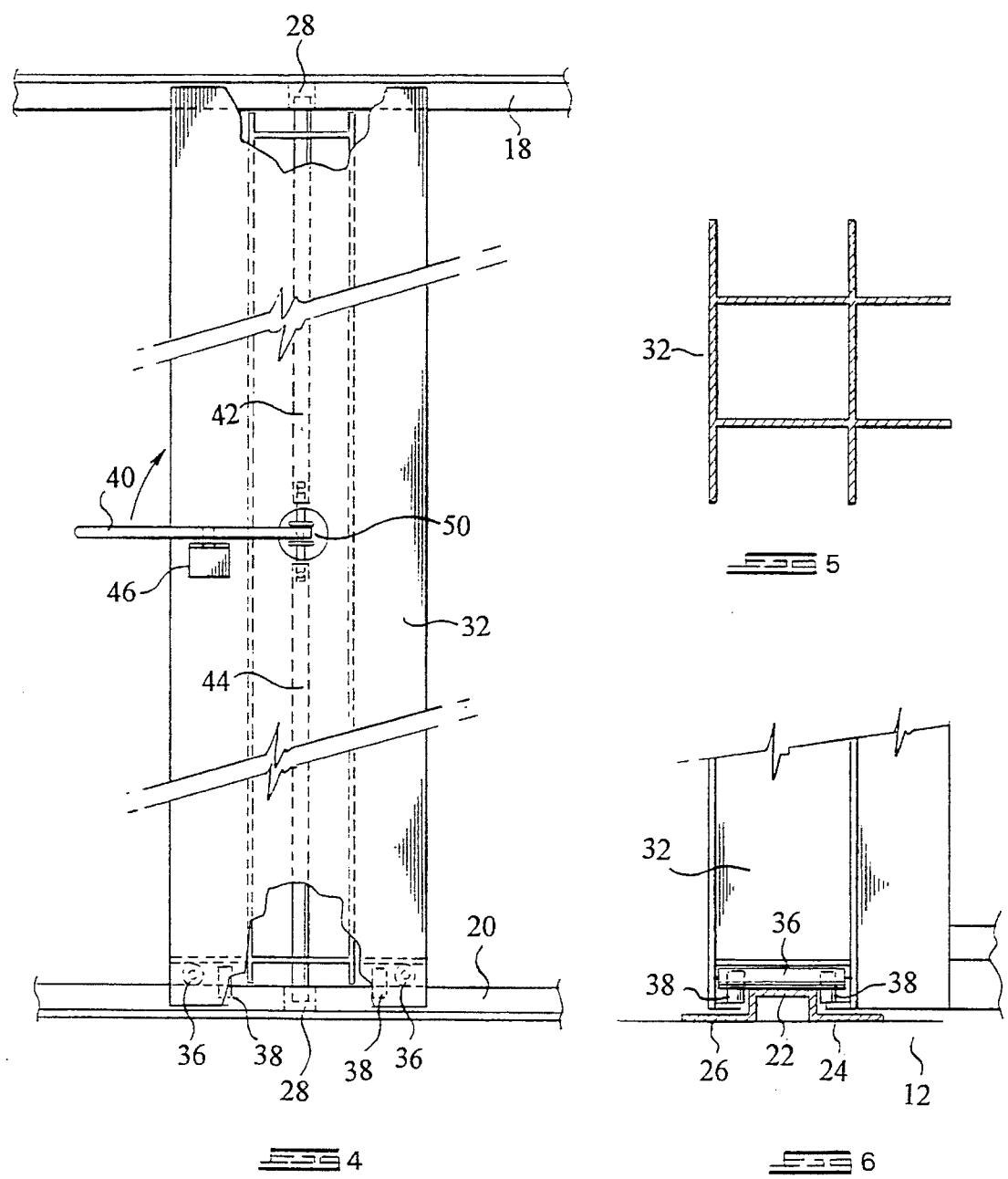

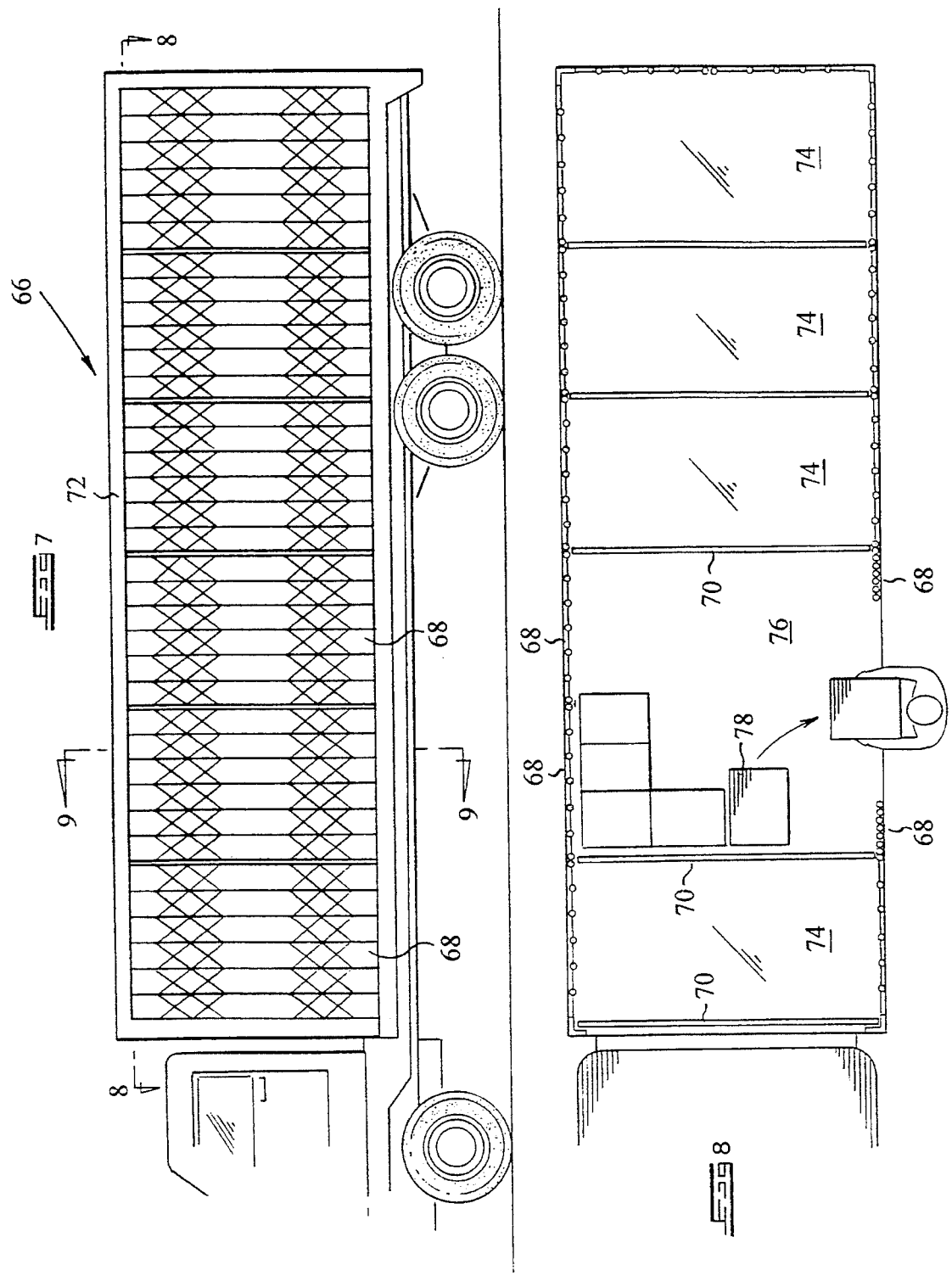

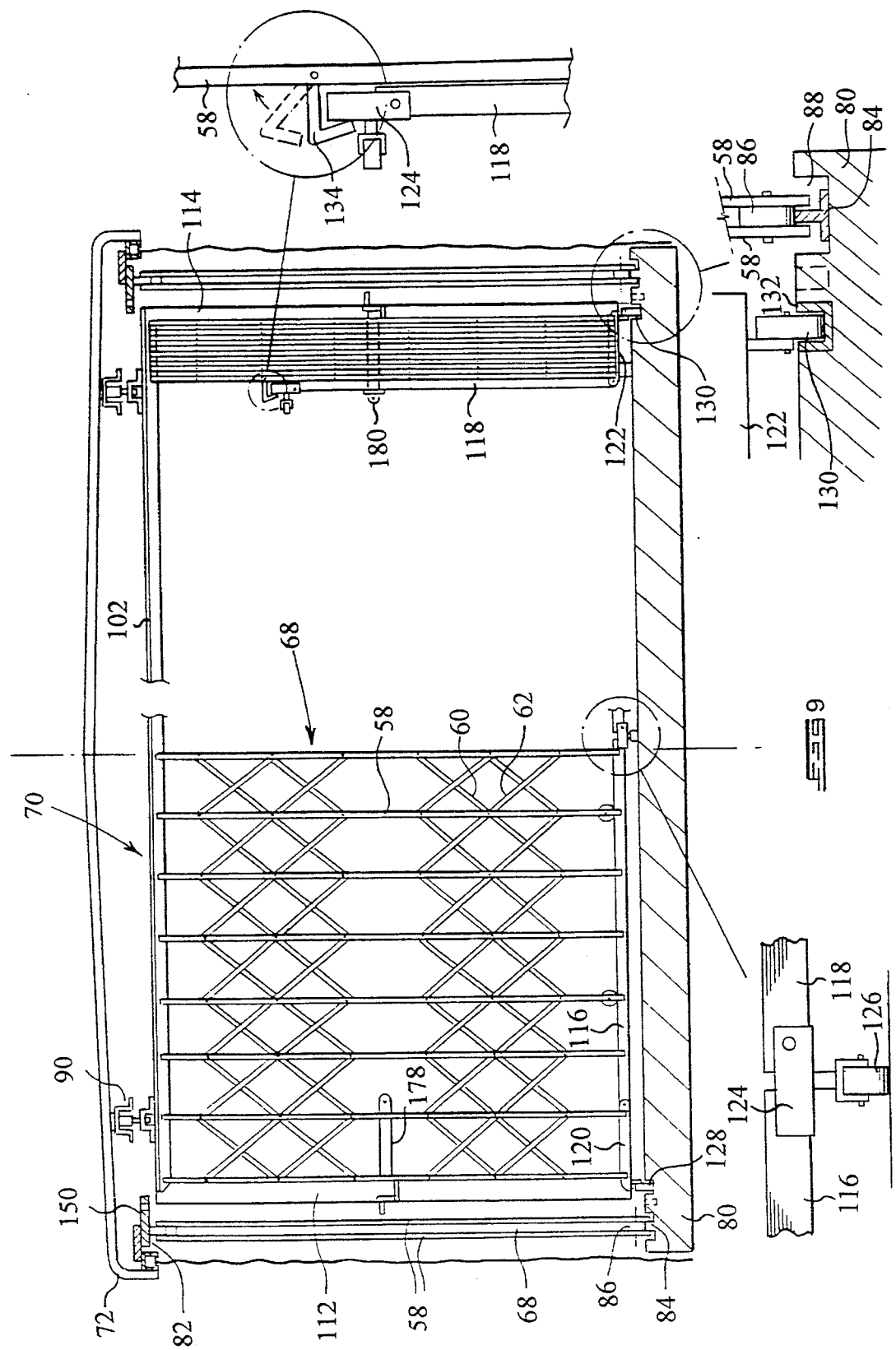

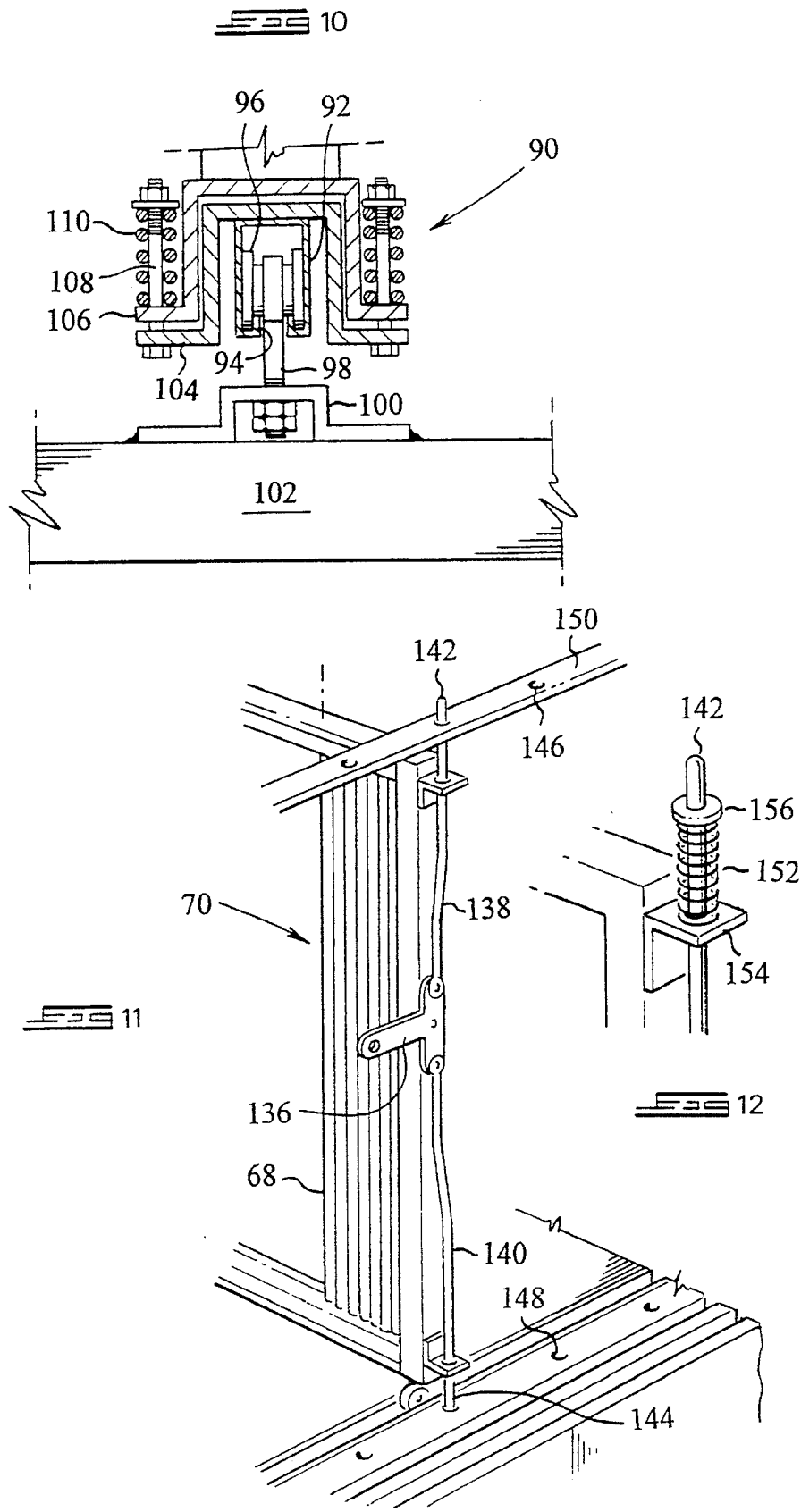

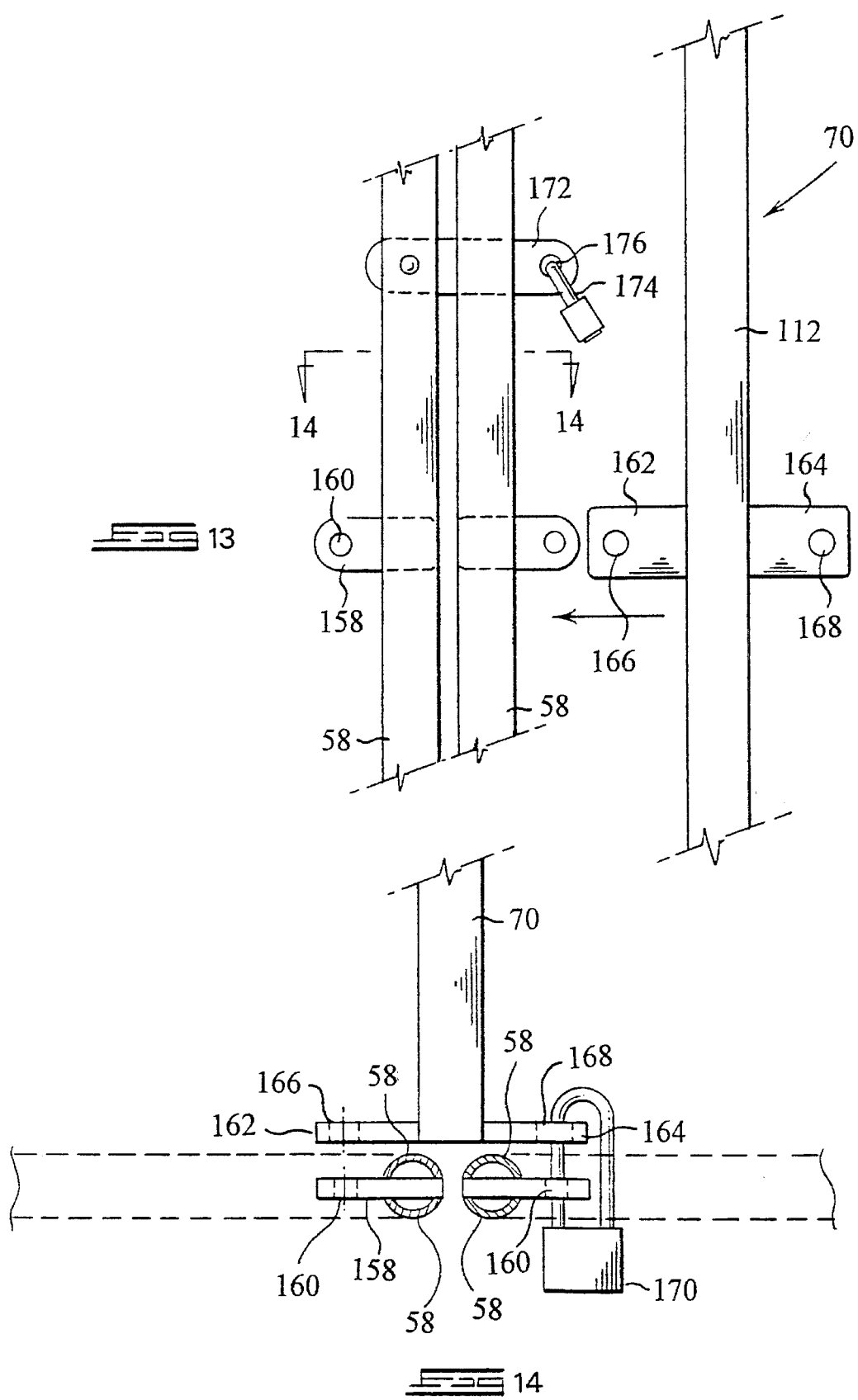

APPARATUS FOR PARTITIONING A STORAGE SPACE

BACKGROUND OF THE INVENTION

This invention relates to an apparatus for partitioning a storage space such as the interior of a load carrying vehicle or a store room.

When a vehicle having an enclosed storage space is used to transport multi-drop loads, it may be necessary to unload the vehicle partially or completely to reach the goods which must be unloaded. Apart from the inconvenience and waste of time involved in this procedure, the possibility arises of some of the goods being stolen. As a result, some customers refuse to share a delivery vehicle, with resulting inefficiency and increased costs when smaller loads have to be delivered.

Other vehicles have open sides, which may be covered by tarpaulins in transport. Such vehicles are easier to unload, but the possibility of theft is even greater with such vehicles. The possibility of theft can also arise when several parties have access to a common store room.

SUMMARY OF THE INVENTION

According to a first aspect of the invention apparatus for partitioning a storage space comprises:

at least one primary frame defining an opening therein via which the storage space is accessible;

at least one first guide means;

at least one partition element engagable with the at least one first guide means and movable transversely relative to the opening in the primary frame to define at least two compartments of desired relative size in the storage space;

at least one second guide means; and at least two expandable closure elements engagable with the at least one second guide means to close the opening in the primary frame on either side of the at least one partition element, thereby closing the at least two compartments in the storage space.

The at least one first guide means may comprise a track arranged parallel to an edge of the opening in the primary frame.

The at least one first guide means may comprise upper and lower tracks situated adjacent opposed upper and lower edges of the opening in the primary frame.

Preferably, the upper track is supported resiliently relative to a support structure.

In a preferred embodiment the upper track comprises a channel section hung below a supporting section on spring-loaded hangers.

At least one roller may be attached to an upper portion of the partition element and arranged to engage the upper track of the at least one first guide means, to support the partition element movably above a floor of the storage space.

The at least one partition element may comprise a secondary frame defining a secondary opening therein, and at least one expandable closure element movable within the secondary opening to close it selectively.

Preferably, the secondary frame comprises at least one hinged frame element in a lower edge portion thereof, the hinged frame element being movable between a first position in which it completes the frame and defines a portion of a track for the at least one expandable closure element, and a second position in which it breaks the frame to allow unrestricted access therethrough.

A locking mechanism may be provided on the secondary frame which comprises an operating lever and at least one locking element extendable from the secondary frame to engage locking formations adjacent to the first guide means.

The locking mechanism may include a resilient bias element arranged to bias the locking pin into a locked condition in which the locking pin engages the locking formations.

Each expandable closure element is preferably a trellis-type door comprising a plurality of parallel members connected by sets of crossed link members, each link member being connected pivotally at opposite ends thereof to parallel members on either side of a central parallel member.

Locking means may be provided at least one side edge of each expandable closure element for selective locking engagement with an adjacent expandable closure element or a partition element.

In one version of the invention, at least one pair of upright pillars is provided on either side of the storage space and between adjacent expandable closure elements, each pillar being supported slidably by respective first guide means, with a partition element extending between the pillars of the at least one pair of pillars.

Typically, the primary frame comprises a part of a goods vehicle body, the storage space being located within the body.

According to a second aspect of the invention apparatus for partitioning a storage space comprises:

an enclosure defining an enclosed storage space with at least one opening therein;

at least one first guide means;

at least one partition element engagable with the at least one first guide means and movable thereon to define at least two compartments of desired relative size in the storage space;

an opening in the partition element; and at least one expandable closure element movable within the opening in the at least one partition element to close the opening selectively.

The enclosure may be a goods vehicle body.

Preferably, the at least one partition element extends transversely across the vehicle body in the storage space and is movable fore an aft along the at least one first guide means.

The at least one first guide means preferably comprises at least one pair of tracks disposed on opposite sides of the storage space.

BRIEF DESCRIPTION OF THE DRAWINGS

FIG. 1 is a side view of a vehicle fitted with apparatus according to a first embodiment of the invention;

FIG. 2 is a plan view of the vehicle of FIG. 1;

FIG. 3 is a detail of the circled portion of FIG. 2;

FIG. 4 is a partially cut-away side view of a support pillar of the apparatus of FIGS. 1 to 3;

FIG. 5 is a sectional view of the pillar;

FIG. 6 is a detail partial end view of the pillar;

FIG. 7 is a side view of a vehicle fitted with apparatus according to a second embodiment of the invention;

FIG. 8 is a sectional plan view of the vehicle on the line 8—8 in FIG. 7;

FIG. 9 is a partial sectional end view on the line 9—9 in FIG. 7, showing a partition element of the apparatus of FIGS. 7 and 8;

FIG. 10 is a partial sectional view of a support arrangement for the partition element of FIG. 9;

FIG. 11 is a pictorial view of a locking arrangement for the partition element of FIGS. 9 and 10;

FIG. 12 is a detail of an alternative version of the locking mechanism of FIG. 11;

FIG. 13 is a detail of a locking arrangement for closure means of the apparatus; and FIG. 14 is a partial sectional plan view of the locking arrangement in use.

DESCRIPTION OF EMBODIMENTS

FIG. 1 shows a truck 10 with a load bed 12 with open sides. The truck has double rear doors 14 and 16 of a conventional nature. On either side of the load bed 12 are rectangular frames formed by the body of the vehicle and each defining a rectangular opening through which a storage space for a load carried by the vehicle is accessible. The upper and lower edges of the opening are defined by upper and lower tracks 18 and 20 which are formed from channel sections (see FIGS. 3, 4 and 6). As best seen in FIG. 3, a section of the lower track 20 comprises a central upstanding base portion 22 with wide outwardly extending flanges 24 and 26. Rectangular apertures 28 are formed at regular intervals in the upstanding base portion 22 of the track. Countersunk machine screws 30 secure the track to the vehicle load bed.

On each side of the vehicle, upright support pillars 32 and 34 are held captive between the upper and lower tracks 18 and 20, and can slide along the length of the vehicle.

A pillar 32 is shown in greater detail in FIGS. 4, 5 and 6 and is seen to comprise an extrusion (typically an aluminium extrusion) which carries first sets of horizontal rollers 36 which engage the upper surface of the track 20 (or the lower surface of the track 18) and second sets of upright guide rollers 38 which engage the sides of the upstanding base portions of the tracks. The rollers 38 are oriented at 90° relative to the rollers 36. The groups of rollers are sufficiently far apart to prevent undue rocking of the support pillars and to allow smooth sliding thereof.

Located more or less centrally on each pillar is a locking handle 40 which is connected to upper and lower locking rods 42 and 44 by a knuckle mechanism 50. With the handle in the horizontal position shown in FIG. 4, the extreme ends of the locking rods engage apertures 28 in the upper and lower tracks, locking the support pillar in a desired position along the length of the tracks 18,20. Upward movement of the handle 40 withdraws the ends of the locking rods, allowing free movement of the pillars. A bracket 46 is provided on each pillar adjacent to the handle 40. Aligned apertures in the handle and the bracket allow a padlock to be used to lock the handle in its illustrated position.

Referring again to FIG. 1, it can be seen that an expandable trellis-type door 48 is connected between the first support pillar 32 and the left hand side of the frame, with a second trellis-type door 48 being connected between the adjacent pillars 32. The pillars and trellis-type doors on the other side of the vehicle are arranged in the same way. Partitions 52 and 54 connect the respective pairs of pillars 32 and 34 across the width of the load bed. These partitions can be hinged, for example at the top or sides, if required, or can comprise frames with their own trellis-type doors, as described below.

Each trellis-type door comprises a number of pairs of elongate parallel upright members 58, interconnected by sets of crossed link members 60 and 62. FIG. 9 shows the structure of one of the trellis-type doors in greater detail. Each link member 60,62 extends between three adjacent pairs of uprights 58, with the centres of overlapping link members 60 and 62 being connected to a common pivot point between an intermediate pair of uprights 58, with the extreme ends of each link member being connected to pivot points between adjacent pairs of uprights 58 on either side of the central uprights. The pivot points are typically defined by heavy duty rivets, which hold the link members securely between the uprights 58, while allowing pivotal movement thereof with some friction for stability. The result is an extendable door structure which can be extended to close an opening in a frame, or compressed to a small fraction of its extended length, to leave the opening clear.

It will be appreciated that by sliding the pairs of pillars 32 and 34 fore and aft to a desired position, the load space of the vehicle can be partitioned into areas of different size, with the trellis-type doors being adjusted accordingly. Access can be gained to any of the partitioned areas via the trellis-type doors, or to the rearmost compartment through the conventional rear doors 14 and 16 of the vehicle. The trellis-type doors are fitted with locking mechanisms (see below), allowing each door to be secured to one of the pillars or to the frame in a closed position.

It will be appreciated that a greater or lesser number of pillars and associated doors can be fitted, according to the requirements of the load carrier. Instead of the rigid partitions 52 and 54, trellis-type doors can be fitted transversely between pairs of pillars. In this case, the respective pillars in a pair can be joined at top and bottom by a rigid track member or frame on which the trellis-type door runs. The rear doors 14 and 16 can also be trellis-type doors, instead of conventional wing-type doors. The trellis-type doors could also be replaced with overlapping sliding doors or another type of telescoping door, achieving a similar result.

Finally, a tarpaulin 56 can be used to cover the sides of the truck for weather protection.

FIG. 7 illustrates an alternative embodiment of the invention. In FIG. 7, a goods vehicle 66 is shown which has six sets of trellis-type doors 68 arranged along each side edge thereof. Unlike the embodiment of FIGS. 1 to 6, there are no sliding pillars between the sets of trellis-type doors, and adjacent edges of the trellis-type doors abut one another. Five transversely extending partition elements 70 are provided within the storage space defined by the body of 72 of the vehicle, but are movable completely independently of the trellis-type doors, providing greater versatility in configuring the internal partitioning of the storage space. As best seen in FIG. 8, the storage space of the vehicle is partitioned into four sub-compartments 74 of equal size, and one larger sub-compartment 76, which is double the size of the compartments 74. The trellis-type doors 68 on one side of the compartment 76 have been opened to allow unloading of boxes 78 in that compartment, while the other compartments remain securely locked.

FIG. 9 illustrates the arrangement of the trellis-type doors 68 and the partition elements 70 in greater detail. Between the body 72 and the load bed 80 are first and second sets of tracks which support the trellis-type doors and partition elements respectively. A first, outermost set of tracks for the trellis-type doors 68 comprises an upper track 82 and a lower track 84. Pairs of upright trellis-type door elements 58 are provided at intervals with rollers 86 between them which engage the lowermost track 84. The enlarged detail in FIG. 9 shows that the track comprises a T-shaped angle section, which is welded into a slot 88 in the vehicle load bed 80. The uppermost track 82 is welded together from flat bar sections, and provides a guide for the upper ends of the uprights 58 of the trellis type doors.

A second, inner set of tracks 90 is provided for supporting the partition elements 70. A single track 90 is shown in section in FIG. 10. The track is seen to comprise a channel section 92 with re-entrant lips 94, in which a roller assembly 96 runs. The roller assembly is connected by means of a bolt to a bracket 100 which is welded to an upper frame member 102 of the partition element 70. The channel section 92 is welded to a larger channel section 104, which is supported on hangers below a third, still larger channel section 106. The hangers comprise bolts 108 which are supported on coil springs 110 resting on the outermost flanges on the channel section 106. The channel 92 in which the roller assembly 96 runs is effectively supported resiliently.

Referring again to FIG. 9, the partition element 70 is seen to comprise a rectangular frame. The frame has an upper edge member 102, opposed side members 112 and 114 which comprise square-section tubing, and a pair of lower frame members 116 and 118 which are hinged to respective stub frame members 120 and 122. When the lower frame members 116 and 118 are lowered, their adjacent ends abut one another as seen in the enlarged detail, and the free end of the left hand frame member 116 rests in a bracket 124 which is rivetted to the end of the right hand frame member 118. A roller 126 extends from the bottom of the bracket 124 and supports the central portion of the lower edge of the frame in use.

Rollers 128 and 130 are provided at opposite ends of the lowermost portion of the frame and run in respective tracks 132 which are set into the floor of the vehicle load bed, thus supporting the partition element 70 when it is moved fore and aft in the vehicle. Both the sets of tracks on either side of the vehicle floor are set into the floor, so that they do not pose any obstruction to containers being slid into or out of the vehicle. In a simplified embodiment, the partition element 70 may be supported at its top edge only.

The right hand lowermost frame member 118 is shown in an upright position, with the right hand section of the trellis-type door 68 retracted. A gravity-biased catch 134 is provided to lock the frame member in the upright position. In addition, locking arms 178 and 180 are provided which extend between the pairs of uprights 58 of the doors 68 when retracted, and have holes in their ends to allow the doors 68 to be locked in the retracted position with padlocks. By opening the trellis-type doors and opening the lowermost frame members to an upright position as shown, unimpeded access is provided through the partition 70, without it being necessary to lift goods over the lowermost frame portions of the partition elements. In some applications this feature may not be required, and can be dispensed with.

FIG. 11 shows a locking mechanism which is provided at either side of each partition element 70. The locking mechanism comprises a T-shaped operating handle or lever 136 which is pivoted to the edge of the frame of the partition element and which is connected to locking rods 138 and 140. The ends of the rods 138 and 140 terminate in locking pins 142 and 144, which engage respective locking apertures 146 and 148 between the inner and outer sets of tracks. The uppermost apertures 146 are provided in flat bar sections 150 forming part of the uppermost tracks 82 for the trellis-type doors, while the apertures 148 are formed in the load bed of the vehicle between the inner and outer sets of tracks.

FIG. 12 shows an embodiment of the locking mechanism in which a compressed coil spring 152 is provided between a guide bracket 154 on the frame of the partition element 70 and a washer 156 fixed to the locking pin 142 to bias the locking pin into a locked position under the urging of the spring.

FIGS. 13 and 14 show how the trellis-type doors can be locked to one another and to the partition elements 70. In FIG. 13, only the end pairs of uprights 58 of two adjacent trellis-type doors are shown. Welded between the pairs of uprights 58 of each trellis-type door are inwardly extending tabs 158 with apertures 160 formed therein. On the side frame member 112 of a partition element 70, complemental opposed tabs 162 and 164 are formed, each with respective apertures 166 and 168. When the edge members of the trellis-type doors are drawn up adjacent to the edge of the partition element 70, as best seen in FIG. 14, the hasp of a padlock 170 can be passed through adjacent apertures 160 and 166 (or 160 and 168) to lock the edge of the respective trellis-type door to the partition element.

In addition, a pivoting link 172 is provided at one edge of each set of trellis-type doors, and can pass between the pairs of uprights 58 of an adjacent trellis-type door as illustrated in FIG. 13, allowing the doors to be secured together by means of a padlock 174, the hasp of which passes through an aperture 176 in the free end of the link 172. Thus, the trellis-type doors 68 can be secured together, or to the partition elements 70, allowing maximum versatility in configuring the storage space of the vehicle. A number of the partition elements can be moved right out of the way to the front end of the vehicle if desired, to create a larger storage space. Alternatively, a number of equal sized storage spaces can be created, or an intermediate arrangement can be selected.

The described partitioning apparatus provides maximum flexibility in the partitioning of a storage space, whether in a goods vehicle or in a storeroom for example, while retaining maximum security. The arrangement is particularly useful in goods vehicles which are used for multi-drop deliveries, allowing goods for different customers to be locked securely while goods for other customers are unloaded. For example, it is possible that personnel at each of the drop sites can have a key only for the compartment in which their goods are stored, helping to reduce theft and tampering. Clearly, it is not necessary to allow access to more than one compartment, so that access by unauthorised personnel is prevented. In addition, the various constructional features are designed to contribute to ease of use and reliability.

I claim:

1. Apparatus for partitioning a storage space comprising:
    at least one primary frame defining an opening therein via which the storage space is accessible;
    at least one first guide means;
    at least one partition element engagable with the at least one first guide means and movable transversely relative to the opening in the primary frame to define at least two compartments of desired relative size in the storage space, wherein each compartment is accessible through the opening defined by a primary frame;
    at least one second guide means; and
    at least two expandable closure elements engagable with the at least one second guide means to close the opening in the primary frame on either side of the at least one partition element, thereby closing the at least two compartments in the storage space.

2. Apparatus according to claim 1 wherein the at least one first guide means comprises a track arranged parallel to an edge of the opening in the primary frame.

3. Apparatus according to claim 2 wherein the at least one first guide means comprises upper and lower tracks situated adjacent opposed upper and lower edges of the opening in the primary frame.

4. Apparatus according to claim 3 wherein the upper track is supported resiliently relative to a support structure.

5. Apparatus according to claim 4 wherein the upper track comprises a channel section hung below a supporting section on spring-loaded hangers.

6. Apparatus according to claim 3 wherein at least one roller is attached to an upper portion of the partition element and arranged to engage the upper track of the at least one first guide means, to support the partition element movably above a floor of the storage space.

7. Apparatus according to claim 1 wherein the at least one partition element comprises a secondary frame defining a secondary opening therein, and at least one expandable closure element movable within the secondary opening to close it selectively.

8. Apparatus according to claim 7 wherein the secondary frame comprises at least one hinged frame element in a lower edge portion thereof, the hinged frame element being movable between a first position in which it completes the frame and defines a portion of a track for the at least one expandable closure element, and a second position in which it breaks the frame to allow unrestricted access therethrough.

9. Apparatus according to claim 7 wherein a locking mechanism is provided on the secondary frame which comprises an operating lever and at least one locking element extendable from the secondary frame to engage locking formations adjacent to the first guide means.

10. Apparatus according to claim 9 wherein the locking mechanism includes a resilient bias element arranged to bias the locking pin into a locked condition in which the locking pin engages the locking formations.

11. Apparatus according to claim 1 wherein locking means are provided at least one side edge of each expandable closure element for selective locking engagement with an adjacent expandable closure element or a partition element.

12. Apparatus according to claim 1 wherein at least one pair of upright pillars is provided on either side of the storage space and between adjacent expandable closure elements, each pillar being supported slidably by respective first guide means, with a partition element extending between the pillars of the at least one pair of pillars.

13. Apparatus according to claim 1 wherein the primary frame comprises a part of a goods vehicle body, the storage space being located within the body.

14. Apparatus according to claim 1 wherein the storage space comprises part of a goods vehicle body.

15. Apparatus according to claim 14 wherein the at least one partition element extends transversely across the vehicle body in the storage space and is movable fore an aft along the at least one first guide means.

16. Apparatus according to claim 1 wherein the at least one first guide means comprises at least one pair of tracks disposed on opposite sides of the storage space.

* * * * *